United States Patent
Labyre (10) Patent No.: US 11,677,444 B2
(45) Date of Patent: Jun. 13, 2023

(54) CONTACTLESS TRANSPONDER AND METHOD

(71) Applicant: STMicroelectronics (Grenoble 2) SAS, Grenoble (FR)

(72) Inventor: Jean-Louis Labyre, Sassenage (FR)

(73) Assignee: STMicroelectronics (Grenble 2) SAS, Grenoble (FR)

( * ) Notice: Subject to any disclaimer, the term of this patent is extended or adjusted under 35 U.S.C. 154(b) by 0 days.

(21) Appl. No.: 17/374,051

(22) Filed: Jul. 13, 2021

(65) Prior Publication Data

US 2022/0029662 A1 Jan. 27, 2022

(30) Foreign Application Priority Data

Jul. 27, 2020 (FR) ...................................... 2007916

(51) Int. Cl.
*H04B 5/00* (2006.01)
(52) U.S. Cl.
CPC ......... *H04B 5/0068* (2013.01); *H04B 5/0031* (2013.01); *H04B 5/0081* (2013.01)
(58) Field of Classification Search
CPC .................................................. H04B 5/00–02
See application file for complete search history.

(56) References Cited

U.S. PATENT DOCUMENTS

| | | | |
|---|---|---|---|
| 2008/0303631 A1 | 12/2008 | Beekley et al. | |
| 2012/0007723 A1* | 1/2012 | Whitaker | G06K 19/0709 340/10.51 |
| 2014/0022060 A1* | 1/2014 | Boehler | H04B 5/0056 340/10.51 |
| 2014/0062661 A1* | 3/2014 | Gallo | G06K 19/07769 340/9.1 |
| 2014/0068145 A1* | 3/2014 | Gallo | G06F 13/4059 711/E12.001 |
| 2015/0116296 A1* | 4/2015 | Greene | H04B 5/0075 345/211 |
| 2017/0091123 A1 | 3/2017 | Sato et al. | |
| 2019/0268040 A1* | 8/2019 | Maillet | H04B 5/0062 |
| 2019/0268043 A1* | 8/2019 | Maillet | H04B 5/0062 |

FOREIGN PATENT DOCUMENTS

| | | |
|---|---|---|
| EP | 0733992 A2 | 9/1996 |
| FR | 3078451 A1 | 8/2019 |

* cited by examiner

*Primary Examiner* — Gennadiy Tsvey (74) *Attorney, Agent, or Firm* — Slater Matsil, LLP (57) ABSTRACT

According to one aspect, a contactless transponder comprises a memory, an antenna configured to receive signals, a contactless interface coupled to the antenna and configured to emit memory access requests according to the signals received, a wired interface configured to receive memory access requests, an arbitration module configured to authorize access to the memory either for access requests emitted by the contactless interface or for access requests received by the wired interface, and wherein the wired interface is also configured to receive shutdown controls and transmit these shutdown controls to the arbitration module, the arbitration module being configured to be able to shut down the contactless interface when it receives a shutdown control.

20 Claims, 3 Drawing Sheets

CONTACTLESS TRANSPONDER AND METHOD

CROSS-REFERENCE TO RELATED APPLICATIONS

This application claims the benefit of French Application No. 2007916, filed on Jul. 27, 2020, which application is hereby incorporated herein by reference.

TECHNICAL FIELD

Embodiments and implementations of the disclosure relate to contactless transponders, in particular NFC transponders or RFID transponders.

BACKGROUND

In the field of wireless (contactless) communication technologies, radio frequency identification is known, better known under the name RFID (Radio Frequency Identification). RFID can automatically detect and identify transponders attached to objects using radio frequency waves.

In the field of wireless communication technologies, near field communication are also known, better known under the name NFC (Near Field Communication), which is an extension of radio frequency identification.

Near field communication enables a communication by radio frequency waves over a short distance between a contactless reader and a transponder.

A contactless transponder is an electronic device capable of exchanging pieces of information via an antenna with a contactless reader, according to a contactless communication protocol, for example a protocol compatible with NFC or RFID technology.

A contactless transponder can be a tag or a card.

Such a contactless transponder can be incorporated into a connected object also comprising a microcontroller. The contactless transponder is then used as a gateway between a contactless reader and the microcontroller of the connected object.

The connected object can be a connected watch, or a connected home automation equipment, or else a connected public equipment, such as a connected streetlight, without these examples being limiting.

The contactless reader is an external communication apparatus which can be a cellular mobile telephone (also known as a "smartphone") for example.

The contactless transponder may comprise a wired interface allowing communicating with the microcontroller, and a contactless interface coupled to an antenna of the connected object allowing communicating with the contactless reader.

The contactless transponder may also comprise a memory that can be accessed by the wired interface and the contactless interface.

Such a contactless transponder used as a gateway can also be called a "dynamic transponder" since the data stored temporarily in its memory can vary over time, either because of the contactless reader, or because of the microcontroller.

For such a transponder, simultaneous access to the memory by the wired interface and the contactless interface is not possible. An arbitration solution is therefore generally provided allowing managing memory accesses. In particular, a used arbitration solution consists in giving memory access to the interface, among the wired interface and the contactless interface, which first emitted an access request.

Memory access requests from the other interface are then ignored as long as the memory is accessed by the interface that gained access to the memory.

The interface waiting for memory access has no information about the memory access status. This interface therefore regularly emits new access requests until it is granted access to the memory.

However, access requests by the contactless interface may be frequent, in particular when the transponder is attacked by repeated access requests emitted by a contactless reader. In this case, access requests emitted by the microcontroller can be ignored as long as memory access is assigned to the contactless interface. Access requests from the contactless interface therefore make it difficult or even prevent access to memory by the microcontroller. Assigning memory access to the wired interface can therefore be time consuming and energy intensive as the microcontroller must regularly emit access requests.

There is therefore a need to provide a solution allowing a transponder to authorize memory access to the microcontroller at any time, in particular even when repeated access requests are emitted by the contactless interface.

SUMMARY

According to one aspect, a contactless transponder comprises a memory, an antenna configured to receive signals, in particular radiofrequency signals, a contactless interface coupled to the antenna and configured to emit memory access requests according to the signals received, a wired interface configured to receive memory access requests, an arbitration module configured to authorize access to the memory either for access requests emitted by the contactless interface or for access requests received by the wired interface, and wherein the wired interface is also configured to receive shutdown controls and transmit these shutdown controls to the arbitration module, the arbitration module being configured to be able to shut down the contactless interface when it receives a shutdown control, so as to authorize exclusive access to the memory for access requests received by the wired interface.

In particular, the wired interface can be configured to receive memory access requests from a master module external to the transponder, in particular via a bus. The master module is a processing unit, for example a microcontroller. The master module can be configured to emit shutdown controls and requests for access of the transponder to the memory.

The transponder can therefore be used as a gateway between this master module and a contactless reader.

The proposed transponder is configured to shut down the contactless interface as soon as the master module indicates that it wishes to access the memory by transmitting the shutdown control to the wired interface of the transponder. By shutting down the contactless interface, the latter can no longer access the memory.

The contactless interface can therefore no longer block access of the master module to the memory.

In this way, the master module obtains exclusive access to the memory.

Such a transponder is therefore robust against attacks by repeated access requests emitted by a contactless reader.

In an advantageous embodiment, the arbitration module is configured to generate an interrupt signal and to transmit this interrupt signal to an output of the transponder after shutting down the contactless interface.

This transponder output is thus configured to transmit the interrupt signal to the master module. In particular, the master module can then comprise an input electrically connected to this output of the transponder by a wired connection to receive the interrupt signal. The interrupt signal then allows informing the master module that the contactless interface is shut down. The interrupt signal therefore allows indicating to the master module that its memory access requests can be processed.

The master module therefore does not have to regularly send memory access requests until memory access is granted. The master module simply waits to receive the interrupt signal. Receiving the interrupt signal informs the master module that its memory access requests will be granted.

Because the master module simply has to wait to receive the interrupt signal, the power consumption of the master module is reduced. Furthermore, time can be saved because the interrupt signal indicates the moment from which an access request can be emitted and granted.

In addition, the traffic on the bus is reduced.

In an advantageous embodiment, the wired interface is also configured to receive reactivation controls and transmit these reactivation controls to the arbitration module, the arbitration module being configured to reactivate the contactless interface when it receives a reactivation control.

In particular, the master module can be configured to emit the reactivation controls that it transmits to the wired interface.

The wired interface can therefore be configured to receive reactivation controls coming from the master module.

In this way, the master module is configured to reactivate the contactless interface when it no longer needs to access the memory.

In particular, the master module can be configured to be able to reactivate the contactless interface at the end of a memory access of this master module.

Alternatively, or in combination, it is also possible to reactivate the contactless interface when the wired interface is deactivated (in particular when a wired power supply is cut).

In an advantageous embodiment, the arbitration module is configured to receive a piece of information on a state of a write access to the memory by the contactless interface, and, when a shutdown control is received while a write access to the memory by the contactless interface is in progress, to wait for this write access to be completed to shut down the contactless interface.

Thus, the transponder is configured to allow the contactless interface to complete a write in the memory after receiving a shutdown control.

The transponder then allows preventing memory corruption that may occur when the contactless interface is shut down before writing is complete.

Advantageously, the wired interface is adapted to be coupled to an I²C (Inter Integrated Circuit) bus. Alternatively, the bus can be of the SPI (Serial Peripheral Interface) type.

Preferably, the wired interface is configured to receive controls including an address and useful data.

Thus, the wired interface is adapted to communicate with an I²C type bus.

In an advantageous embodiment, the shutdown control is a control including an address dedicated to this shutdown control and a read/write bit. Preferably, the address is represented on 7 bits.

The shutdown control then has a simple structure. This structure is adapted to be transmitted by an I²C type bus.

Because a dedicated address is chosen for this shutdown control, the shutdown control is not seen as a memory access request by the transponder. Thus, the shutdown control has no effect on the processing of memory access requests passing through the bus.

Advantageously, the shutdown control is represented by a single byte. The shutdown control is then quick to transmit.

However, alternatively, it is also possible to provide a shutdown control which can be represented on more than one byte.

Likewise, in an advantageous embodiment, the reactivation control is a control including only an address dedicated to this reactivation control and a read/write bit.

The reactivation control then has a simple structure. This structure is adapted to be transmitted by an I²C type bus.

In particular, the address used for the reactivation control is different from that used for the shutdown control.

Because a dedicated address is chosen for this reactivation control, the reactivation control is not seen as a memory access request by the transponder. Thus, the reactivation control has no effect on the processing of memory access requests passing through the bus.

In an advantageous embodiment, the reactivation control is represented by a single byte. The reactivation control is then quick to transmit.

However, alternatively, it is also possible to provide a reactivation control which can be represented on more than one byte.

Preferably, the transponder is capable of exchanging information items via the antenna with an external contactless reader, according to a contactless communication protocol compatible with the NFC or RFID technology.

According to another aspect, a system comprises a transponder as described above, and a master module coupled to the wired interface of the transponder, the master module being configured to emit shutdown controls to the transponder then to send memory access requests after a shutdown of the contactless interface carried out by the arbitration module of the transponder after receiving a shutdown control by the wired interface.

In an advantageous embodiment, the master module is a microcontroller.

According to another aspect, provision is made of a connected object comprising a system as described above.

According to another aspect, a method for managing access to a memory of a transponder as described above, comprises receiving a shutdown control by the wired interface, then transmitting the shutdown control to the arbitration module, and then shutting down the contactless interface by the arbitration module, so as to authorize exclusive access to the memory for access requests received by the wired interface.

In an advantageous embodiment, the method comprises, after shutting down the contactless interface by the arbitration module, generating an interrupt signal by the arbitration module, then transmitting this interrupt signal to an output of the transponder.

In an advantageous implementation, when a shutdown control is received while a write access to the memory by the contactless interface is in progress, the shutdown of the contactless interface is carried out after this write access is completed.

In an advantageous implementation, the method comprises, after shutting down the contactless interface, receiving a reactivation control via the wired interface, then transmitting this reactivation control to the arbitration module, and then reactivating the contactless interface by the arbitration module.

BRIEF DESCRIPTION OF THE DRAWINGS

Other advantages and features of the invention will become apparent upon examining the detailed description of implementations and embodiments, which are in no way limiting, and the appended drawings wherein.

DETAILED DESCRIPTION OF ILLUSTRATIVE EMBODIMENTS

Figure 1:
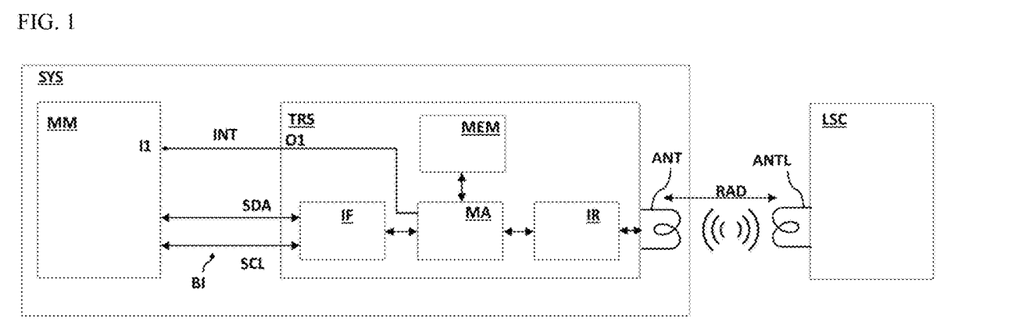
FIG. 1 illustrates a system comprising a contactless transponder and a master module.

FIG. 1 schematically illustrates a system SYS according to one embodiment. The system SYS is configured to communicate with a contactless reader LSC.

The contactless reader LSC can for example be an external contactless communication apparatus, for example a multifunction mobile telephone, better known as "smartphone".

The contactless reader LSC comprises an antenna ANTL.

The system SYS comprises a contactless transponder TRS and a master module MM.

The master module MM is a processing unit, for example a microcontroller.

The transponder TRS can be a tag or a card.

The transponder TRS acts as a gateway between the master module MM and the contactless reader LSC.

The transponder TRS comprises an antenna ANT configured to receive radio frequency signals RAD emitted by the contactless reader LSC.

In particular, the transponder TRS is capable of exchanging information items via the antenna ANT with a contactless reader LSC, according to a contactless communication protocol, for example compatible with the NFC or RFID technology.

NFC technology is an open technological platform standardized in the standard ISO/IEC 18092 and ISO/IEC 21481 and incorporates many already existing standards such as for example ISO 14443 or ISO 15693 used for communication protocols.

When transmitting an information item between the reader LSC and the transponder TRS, the reader LSC generates a magnetic field through its antenna ANTL which is typically a 13.56 MHz sine carrier wave. The pieces of information are communicated by an amplitude modulation of the carrier.

The transponder TRS comprises a contactless interface IR coupled to the antenna ANT.

The contactless interface IR includes in particular a demodulator (not shown) adapted to demodulate the received radio frequency signals in order to obtain the data transmitted from the reader LSC.

The transponder TRS further comprises a wired interface IF coupled to the master module MM via a bus BI. Preferably, the bus BI is an I²C bus. Alternatively, the bus BI can be of the SPI (Serial Peripheral Interface) type for example.

In particular, the bus BI includes two bidirectional lines. A first SDA line is configured to transmit data. The second SCL line is a synchronization clock line.

The contactless transponder TRS also comprises a memory MEM, in particular a non-volatile memory. The memory MEM can for example be an EEPROM memory.

The contactless reader LSC is configured to emit requests for access of the transponder TRS to the memory MEM. These access requests are transmitted to the transponder TRS via radio frequency signals RAD which can be received by the antenna ANT of the transponder TRS.

The contactless interface IR is configured to receive memory MEM access requests resulting from the radio frequency signals received by the antenna ANT and coming from the contactless reader LSC.

The contactless interface can be in an activated or shut down state. The state of the contactless interface is memorized in a register.

The master module MM is also configured to emit requests for access of the transponder LSC to the memory MEM and transmit them to the wired interface IF via the bus BI.

The wired interface IF is therefore configured to receive requests for access to the memory MEM emitted by the master module MM.

Nevertheless, the memory MEM cannot be accessed simultaneously by the access requests received by the wired interface IF and by the access requests received by the contactless interface IR.

The transponder TRS then comprises an arbitration module MA allowing to manage access to the memory MEM.

The arbitration module MA can be a logic circuit.

The arbitration module MA is coupled to the wired interface IF, to the contactless interface IR, and to the memory MEM. The arbitration module MA can thus receive the access requests coming from the wired interface IF and from the contactless interface IR then transmit them to the memory MEM.

Moreover, the master module MM is also configured to emit shutdown controls and transmit them to the wired interface IF through the bus BI.

The wired interface IF is configured to receive shutdown controls and transmit them to the arbitration module MA.

The arbitration module MA is configured to receive shutdown controls from the wired interface IF and to shut down the contactless interface IR after receiving such a shutdown control.

Shutting down the contactless interface IR prevents the contactless reader LSC from accessing the memory MEM of the transponder TRS. Access requests emitted by the contactless reader LSC are then ignored.

The master module then has exclusive access to the memory.

In particular, the transponder TRS is configured to shut down the contactless interface IR as soon as the master module MM indicates that it wishes to access the memory MEM by transmitting the shutdown control to the wired interface IF of the transponder TRS. By shutting down the contactless interface IR, the latter can no longer access the memory MEM.

In this way, the master module MM obtains exclusive access to the memory MEM.

The contactless interface IR can therefore no longer block access of the master module MM to the memory MEM.

Such a transponder TRS is therefore robust against attacks by repeated access requests from a contactless reader LSC.

More particularly, the arbitration module MA is configured, when it receives a shutdown control while a write access by the contactless interface IR to the memory MEM is in progress, to wait for this write access to be completed to shut down the contactless interface IR.

The arbitration module MA is therefore configured to prevent memory MEM corruption that may occur when the contactless interface IR is shut down before writing is complete.

Preferably, the shutdown control is a control including only an address dedicated to this shutdown control and a read/write bit.

The shutdown control then has a simple structure. This structure is adapted to be transmitted by an I²C type bus BI.

Because a dedicated address is chosen for this shutdown control, the shutdown control is not seen as a memory access request by the transponder TRS. Thus, the shutdown control has no effect on the processing of memory access requests passing through the bus BI.

Advantageously, the shutdown control is represented by a single byte, the address dedicated to the shutdown control being represented on 7 bits.

The shutdown control is then quick to transmit.

Moreover, the arbitration module MA is configured to generate an interrupt signal INT and to transmit this interrupt signal to an output O1 of the transponder TRS after shutting down the contactless interface IR after receiving a shutdown control.

The output O1 is then configured to transmit the interrupt signal INT to an input I1 of the master module MM via a wired connection between the output O1 and the input I1.

The interrupt signal INT allows informing the master module MM that the contactless interface IR is shut down. The interrupt signal INT therefore allows indicating to the master module MM that its requests for access to the memory MEM can be processed.

The master module MM therefore does not have to regularly send requests for access to the memory MEM until a memory MEM access request is granted. The master module MM simply waits to receive the interrupt signal INT to know that it can emit requests for access to the memory MEM after emitting the shutdown control.

Because the master module MM simply has to wait to receive the interrupt signal INT, the power consumption of the master module MM is reduced. Furthermore, time can be saved because the interrupt signal INT indicates the moment from which an access request can be emitted and granted.

In addition, the traffic on the bus BI is reduced.

Moreover, the master module MM is also configured to emit reactivation controls and transmit them to the wired interface IF through the bus BI.

The arbitration module is configured to receive reactivation controls from the wired interface IF and to reactivate the contactless interface IR after receiving such a reactivation control.

Reactivating the contactless interface IR allows the contactless reader LSC to re-access the memory MEM of the transponder TRS. Access requests from the contactless interface IR are therefore no longer ignored.

Preferably, the reactivation control is a control including only an address dedicated to this reactivation control and a read/write bit.

The reactivation control then has a simple structure. This structure is adapted to be transmitted by an I²C type bus BI.

In particular, the address used for the reactivation control is different from that used for the shutdown control.

Because a dedicated address is chosen for this reactivation control, the reactivation control is not seen as a memory access request by the transponder TRS. Thus, the reactivation control has no effect on the processing of memory access requests passing through the bus BI.

Preferably, the reactivation control is represented by a single byte, the address dedicated to the reactivation control being represented on 7 bits.

The reactivation control is then quick to transmit.

Alternatively, or in combination, the arbitration module can be configured to be able to reactivate the contactless interface when the wired interface is deactivated (in particular when a wired power supply is cut).

Figure 2:
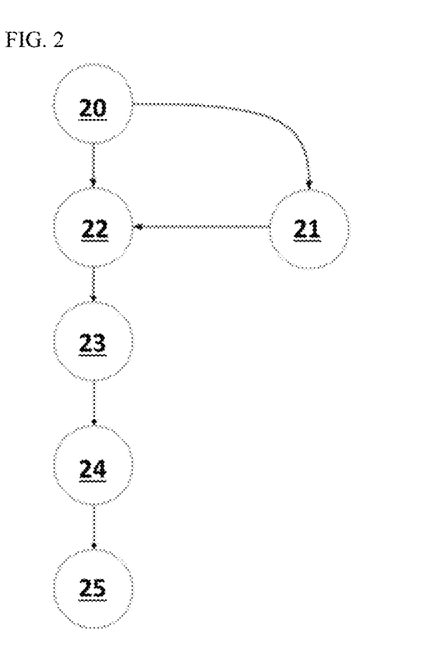
FIG. 2 illustrates a memory access management method.

FIG. 2 illustrates a memory access management method that can be implemented by the transponder TRS described above.

In step 20, the arbitration module MA receives a shutdown control received by the wired interface IF and coming from the master module MM.

If the contactless interface IR is in the process of performing a write access to the memory MEM when the arbitration module MA receives the shutdown control, then the arbitration module MA waits in step 21 for this write access to be completed then shuts down the contactless interface IR in step 22.

Otherwise, the arbitration module MA shuts down the contactless interface IR by going directly to step 22 upon receiving the shutdown control if the contactless interface IR is not in the process of performing a write access to the memory MEM.

After shutting down the contactless interface IR in step 22, the arbitration module MA generates the interrupt signal INT in step 23 and transmits it to the wired interface IF. This interrupt signal is transmitted to the output O1 of the transponder TRS. This interrupt signal is then sent to the input I1 of the master module MM through the wired connection between the input I1 of the master module and the output O1 of the transponder TRS. The interrupt signal is used to indicate to the master module MM that it has exclusive access to the memory MEM.

The contactless interface IR remains shut down in step 24 until the arbitration module MA receives a reactivation control received by the wired interface IF and coming from the master module MM.

Once the reactivation control is received, the arbitration module reactivates the contactless interface in step 25.

Alternatively, the arbitration module can reactivate the contactless interface when the wired interface is deactivated (in particular when a wired power supply is cut).

FIGS. 3 to 7 illustrate examples of implementation of the memory access management method described above. In these figures, the signal 100 represents the radiofrequency controls received and emitted by the contactless interface IR, the signal 101 represents the shutdown controls received by the wired interface IF, the signal 102 represents a state of write access to the memory MEM by the contactless interface IR (the high state of the signal indicating that a write access is in progress and the low state indicating that no write access is in progress), the signal 103 represents the state of the contactless interface (the high state of the signal indicating that the contactless interface is activated and the low state indicating that the contactless interface is shut down), and the signal 104 represents the interrupt signal (shown in the low state).

Figure 3:
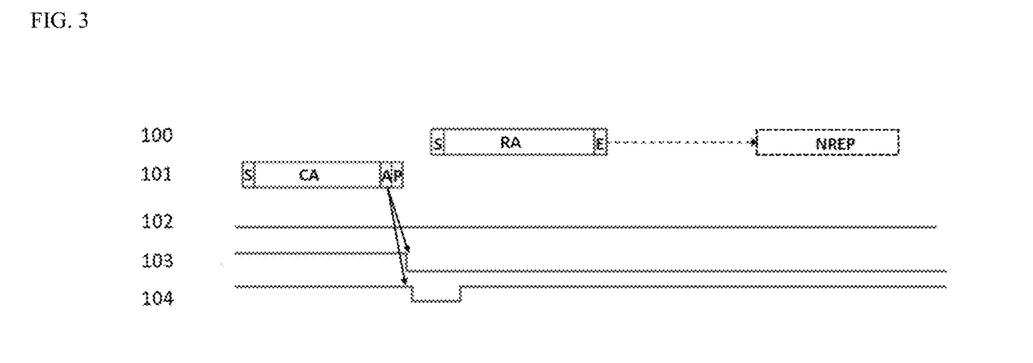
FIGS. 3-7 illustrate timing diagrams for various memory access management examples.

In the example illustrated in FIG. 3, the shutdown control CA is received by the arbitration module MA before emitting an access request RA to the memory by the contactless reader LSC.

The access request RA is transmitted in a frame comprising a first start-of-frame bit S, the access request RA then a last end-of-frame bit E. The shutdown control CA is transmitted in a frame comprising a first start-of-frame bit S, the shutdown control CA then an acknowledgement bit A followed by an end-of-frame bit P.

No write access is therefore in progress at the end of the reception of the shutdown control AC, as shown by the low state of signal 102.

Since no write access to the memory is in progress, the arbitration module MA can directly shut down the contactless interface IR. Signal 103 thus switches to the low state. After shutting down the contactless interface IR, the arbitration module MA generates an interrupt signal which it transmits to the wired interface IF (see signal 104 switching to the low state).

With the contactless interface IR shut down, the access request of the contactless reader LSC is not processed. No response is therefore sent following this access request (the absence of response being represented by the piece of information NREP). The master module MM then obtains exclusive access of the transponder TRS to the memory MEM.

Figure 4:
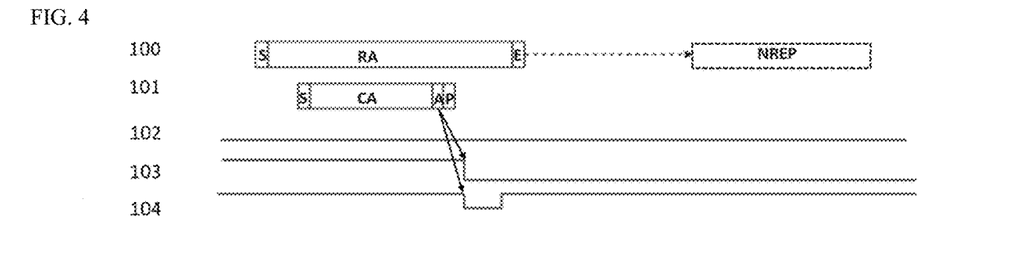

In the example illustrated in FIG. 4, the shutdown control CA is received by the arbitration module MA while an access request RA emitted by the contactless reader LSC is also received by the arbitration module MA.

As previously, the access request RA is transmitted in a frame comprising a first start-of-frame bit S, the access request RA then a last end-of-frame bit E. The shutdown control CA is transmitted in a frame comprising a first start-of-frame bit S, the shutdown control CA and an acknowledgement bit A followed by an end-of-frame bit P.

The reception of the shutdown control ends before the end of the reception of the access request. No write access is therefore in progress at the end of the reception of the shutdown control, as shown by the low state of signal 102.

Since no write access to the memory is in progress, the arbitration module MA can directly shut down the contactless interface IR. The signal 103 thus switches to the low state. After shutting down the contactless interface IR, the arbitration module MA generates an interrupt signal which it transmits to the wired interface IF (see signal 104 switching to the low state).

With the contactless interface IR shut down, the access request emitted by the contactless reader LSC is not processed. No response is therefore sent following this access request (the absence of response being represented by the piece of information NREP). The master module MM then obtains exclusive access of the transponder TRS to the memory MEM.

Figure 5:
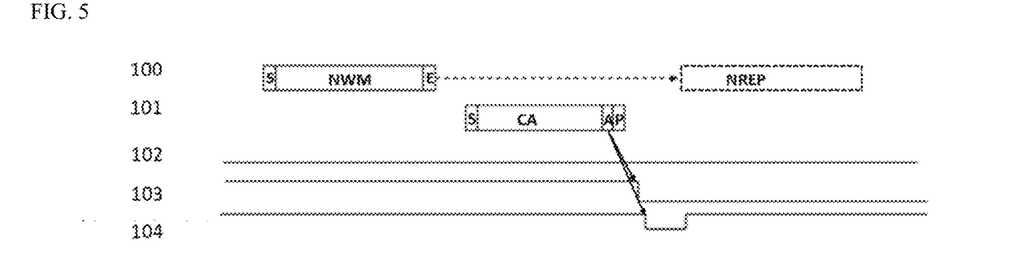

In the example illustrated in FIG. 5, the shutdown control CA is received by the arbitration module MA after a memory access request NWM from the contactless reader LSC has been received, but before a response to this access control has been emitted by the transponder TRS. Here, this access request NWM is not a memory write access request.

The access request NWM is transmitted in a frame comprising a first start-of-frame bit S, the access request NWM then a last end-of-frame bit E. The shutdown control CA is transmitted in a frame comprising a first start-of-frame bit S, the shutdown control CA then an acknowledgement bit A followed by an end-of-frame bit P.

Since no write access to the memory is in progress, the arbitration module MA can directly shut down the contactless interface IR. The signal 103 thus switches to the low state.

After shutting down the contactless interface IR, the arbitration module MA generates an interrupt signal which it transmits to the wired interface IF (see signal 104 switching to the low state).

With the contactless interface IR shut down, the access request from the contactless reader LSC is not processed. No response is sent following this access request (the absence of response being represented by the piece of information NREP). The master module MM then obtains exclusive access of the transponder TRS to the memory MEM.

Figure 6:
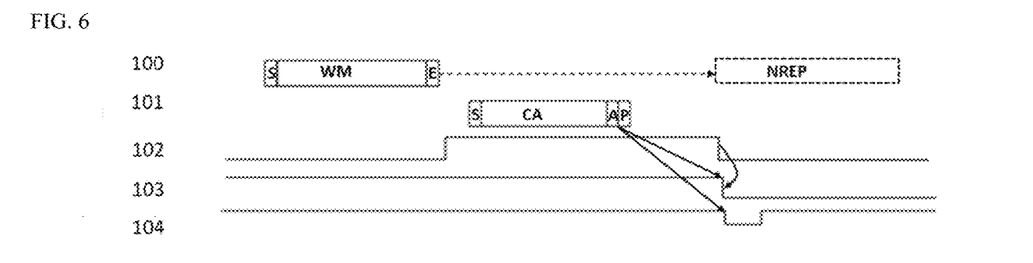

In the example illustrated in FIG. 6, the shutdown control CA is received by the arbitration module MA after a request for write access WM to the memory from the contactless reader LSC has been received, but before a response to this access control has been emitted by the transponder TRS.

The write access WM request is transmitted in a frame comprising a first start-of-frame bit S, the access request WM then a last end-of-frame bit E. The shutdown control CA is transmitted in a frame comprising a first start-of-frame bit S, the shutdown control CA then an acknowledgement bit A followed by an end-of-frame bit P.

Because a write memory access is in progress, the arbitration module MA cannot directly shut down the contactless interface IR to prevent memory corruption that may result from shutting down the contactless interface IR during write access to the memory by this contactless interface IR.

The arbitration module MA therefore waits for the write access to complete before shutting down the contactless interface IR. After write access is complete, the arbitration module MA shuts down the contactless interface IR. The signal 103 thus switches to the low state.

After shutting down the contactless interface IR, the arbitration module MA generates an interrupt signal which it transmits to the wired interface IF (see signal 104 switching to the low state).

With the contactless interface IR shut down, no response is sent following this access request (the lack of response being represented by the piece of information NREP). The master module MM then obtains exclusive access of the transponder TRS to the memory MEM.

Figure 7:
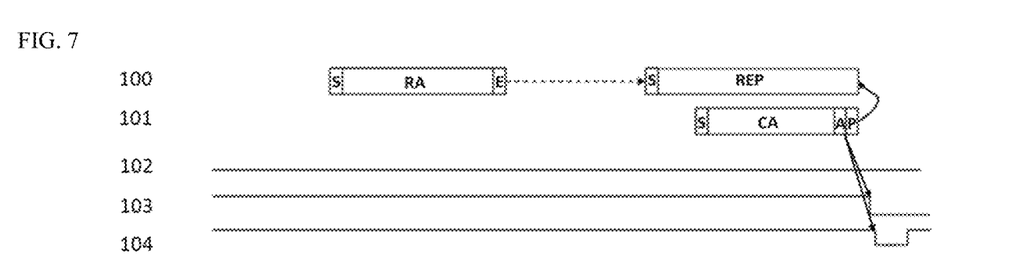

In the example illustrated in FIG. 7, the contactless reader LSC emits a memory access request. This memory access request is processed and a response REP to this access request is transmitted to the contactless reader LSC.

The access request RA is transmitted in a frame comprising a first start-of-frame bit S, the access request RA then a last end-of-frame bit E. The response REP is contained in a frame starting with a start-of-frame bit S. The shutdown control CA is transmitted in a frame comprising a first start-of-frame bit S, the shutdown control CA then an acknowledgement bit A followed by an end-of-frame P bit.

The shutdown control is received after the start of transmission to the contactless reader LSC of the response but before the end of this transmission. Since no write access to the memory occurs after receiving the shutdown control, the arbitration module MA can directly shut down the contactless interface IR. Signal 103 thus switches to the low state.

After shutting down the contactless interface IR, the arbitration module MA generates an interrupt signal which it transmits to the wired interface IF (see signal 104 switching to the low state).

With the contactless interface IR shut down, the access request emitted by the contactless reader LSC is not processed and the transmission of the response REP is not finalized. The master module MM then obtains exclusive access of the transponder TRS to the memory MEM.

Figure 8:
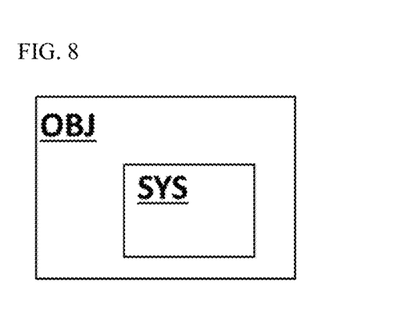
FIG. 8 illustrates a connected object comprising the system of FIG. 1.

The system SYS as described above can be used in the field of connected objects. As such, FIG. 8 schematically illustrates a connected object OBJ comprising a system SYS as described above. The connected object OBJ can be a connected watch, or a connected home automation equipment, or else a connected public equipment, such as a connected lamppost, without these examples being limiting.

What is claimed is:

1. A contactless transponder comprising:
   a memory;
   an antenna configured to receive signals;
   a contactless interface coupled to the antenna and configured to emit first memory access requests according to the signals received;
   a wired interface configured to receive second memory access requests, receive shutdown controls, and transmit the shutdown controls to an arbitration module; and
   the arbitration module, configured to:
      authorize access to the memory either for the first memory access requests emitted by the contactless interface or for the second memory access requests received by the wired interface;
      shut down the contactless interface when receiving a shutdown control initiated by a master module and received via the wired interface, so as to authorize exclusive access to the memory for the second memory access requests received from the master module via the wired interface; and
      after shutting down the contactless interface and while the contactless interface is shut down, generate an interrupt signal indicating the contactless interface is shut down, and transmit the interrupt signal to an output of the contactless transponder.

2. The contactless transponder according to claim 1, wherein the wired interface is also configured to receive reactivation controls and transmit the reactivation controls to the arbitration module, the arbitration module being configured to reactivate the contactless interface when it receives a reactivation control.

3. The contactless transponder according to claim 2, wherein the wired interface is configured to receive controls including an address and useful data, the reactivation control being a control including only an address dedicated to the reactivation control and a read/write bit.

4. The contactless transponder according to claim 3, wherein the reactivation control is represented by a single byte.

5. The contactless transponder according to claim 1, wherein the arbitration module is configured to receive a piece of information on a state of a write access to the memory by the contactless interface, and, when the shutdown control is received while the write access to the memory by the contactless interface is in progress, to wait for the write access to be completed to shut down the contactless interface.

6. The contactless transponder according to claim 1, wherein the wired interface is configured to receive controls including an address and useful data, the shutdown control being a control including only an address dedicated to the shutdown control and a read/write bit.

7. The contactless transponder according to claim 6, wherein the shutdown control is represented by a single byte.

8. The contactless transponder according to claim 1, wherein the wired interface is adapted to be coupled to an $I^2C$ bus.

9. The contactless transponder according to claim 1, capable of exchanging information items via the antenna with an external contactless reader, according to a contactless communication protocol compatible with near filed communication or radio frequency identification technology.

10. A system comprising:
    a contactless transponder comprising:
       a memory;
       an antenna configured to receive signals;
       a contactless interface coupled to the antenna and configured to emit first memory access requests according to the signals received;
       a wired interface configured to receive second memory access requests, receive shutdown controls, and transmit the shutdown controls to an arbitration module; and
       the arbitration module, configured to:
          authorize access to the memory either for the first memory access requests emitted by the contactless interface or for the second memory access requests received by the wired interface;
          shut down the contactless interface when receiving a shutdown control from a master module via the wired interface, so as to authorize exclusive access to the memory for the second memory access requests received from the master module via the wired interface;
          after shutting down the contactless interface and while the contactless interface is shut down, generate an interrupt signal indicating the contactless interface is shut down, and transmit the interrupt signal to the master module; and
    the master module, coupled to the wired interface of the contactless transponder, the master module configured to:
       initiate a shutdown of the contactless interface by sending the shutdown control to the contactless transponder via the wired interface; and
       send the second memory access requests to the arbitration module via the wired interface, after receiving the interrupt signal from the arbitration module of the contactless transponder.

11. The system according to claim 10, wherein the master module is a microcontroller.

12. The system according to claim 10, wherein the wired interface is also configured to receive reactivation controls and transmit the reactivation controls to the arbitration module, the arbitration module being configured to reactivate the contactless interface when it receives a reactivation control.

13. The system according to claim 10, wherein the arbitration module is configured to receive a piece of information on a state of a write access to the memory by the contactless interface, and, when the shutdown control is received while the write access to the memory by the contactless interface is in progress, to wait for the write access to be completed to shut down the contactless interface.

14. The system according to claim 10, wherein the wired interface is configured to receive controls including an address and useful data, the shutdown control being a control including only an address dedicated to the shutdown control and a read/write bit.

15. The system according to claim 14, wherein the shutdown control is represented by a single byte.

16. A method for managing access to a memory of a transponder comprising an antenna configured to receive signals, a contactless interface coupled to the antenna and configured to emit first memory access requests according to the signals received, a wired interface configured to receive second memory access requests, and an arbitration module, configured to authorize access to the memory either for the first memory access requests emitted by the contactless interface or for the second memory access requests received by the wired interface, the method comprising:

receiving, by the wired interface, a shutdown control initiated by a master module;

transmitting the shutdown control to the arbitration module;

shutting down the contactless interface by the arbitration module, so as to authorize exclusive access to the memory for the second memory access requests received from the master module via the wired interface; and after shutting down the contactless interface and while the contactless interface is shut down:

generating, by the arbitration module, an interrupt signal indicating the contactless interface is shut down; and transmitting, by the arbitration module, the interrupt signal to an output of the transponder.

17. The method according to claim 16, wherein, when the shutdown control is received while a write access to the memory by the contactless interface is in progress, a shutdown of the contactless interface is carried out after the write access is completed.

18. The method according to claim 16, further comprising, after shutting down the contactless interface:

receiving a reactivation control via the wired interface;

transmitting the reactivation control to the arbitration module; and reactivating the contactless interface by the arbitration module.

19. The method according to claim 16, further comprising receiving, by the wired interface, controls including an address and useful data, the shutdown control being a control including only an address dedicated to the shutdown control and a read/write bit.

20. The method according to claim 19, wherein the shutdown control is represented by a single byte.

* * * * *

UNITED STATES PATENT AND TRADEMARK OFFICE
CERTIFICATE OF CORRECTION

PATENT NO. : 11,677,444 B2
APPLICATION NO. : 17/374051
DATED : June 13, 2023
INVENTOR(S) : Jean-Louis Labyre Page 1 of 1

It is certified that error appears in the above-identified patent and that said Letters Patent is hereby corrected as shown below:

On the Title Page

Item (73), in Column 1, in "Assignee", Line 1, delete "(Grenble 2)" and insert -- (Grenoble 2) --, therefor.

In the Claims

In Column 12, in Claim 9, Line 19, delete "filed" and insert -- field -- therefor.

Signed and Sealed this
Fifth Day of September, 2023

Katherine Kelly Vidal
*Director of the United States Patent and Trademark Office*